United States Patent [19]

Mathavan et al.

[11] Patent Number: 5,482,766
[45] Date of Patent: Jan. 9, 1996

[54] DEEP-DRAWABLE FILM

[75] Inventors: Thambirahaj Mathavan, Munich; Eberhardt Dous, Steinebach, both of Germany

[73] Assignee: Alkor GmbH Kunststoffe, Munich, Germany

[21] Appl. No.: 267,592

[22] Filed: Jun. 21, 1994

[30] Foreign Application Priority Data

Jun. 21, 1993 [DE] Germany .......................... 43 20 474.0
Sep. 7, 1993 [DE] Germany .......................... 43 30 201.7

[51] Int. Cl.⁶ ..................................................... B32B 5/14
[52] U.S. Cl. ...................... 428/308.4; 428/515; 428/517; 428/519; 428/520; 525/196
[58] Field of Search ..................... 428/515, 308.4, 428/517, 519, 520; 525/196

[56] References Cited

U.S. PATENT DOCUMENTS 3,937,762  2/1976  Nahmias ................... 260/889
4,751,121  6/1988  Kühnel et al. ............... 428/40
4,917,944  4/1990  Breitscheidel et al. ......... 428/516
5,206,294  4/1993  Dawson .................... 525/196

*Primary Examiner*—Edith Buffalow
*Attorney, Agent, or Firm*—Foley & Lardner

[57] ABSTRACT

The present invention relates to a deep-drawable film in the form of a laminated film which contains a top film having certain amounts by weight of (a) at least one crosslinked PP-EPDM and (b) one uncrosslinked propylene block copolymer or heterophase propylene block polymer, 15 to 1% by weight of (b) being replaced with the same amount by weight of a polymer and/or ionomer (c) containing reactive groups. The invention furthermore relates to the process for the production of the laminated film and the use thereof. The bottom film(s) contain(s) certain amounts by weight of (d) at least one partially crosslinked EPDM, (e) one propylene homopolymer, copolymer or graft polymer, (f) at least one polymer and/or ionomer containing reactive groups and (g) at least one polymeric crosslinking agent containing reactive groups.

21 Claims, 1 Drawing Sheet

DEEP-DRAWABLE FILM

BACKGROUND OF THE INVENTION

The present invention relates to a deep-drawable film which (based on 100 parts by weight of plastic in the film) comprises from about 1 to 60% by weight of at least one partially crosslinked EPDM, from about 12 to 30% by weight of a propylene homopolymer, copolymer or graft polymer with or without reactive groups, from about 77 to 9.5% by weight of at least one polymer and/or ionomer containing reactive groups which is based on ethylene and methacrylic acid or acrylic acid, some of the acid groups containing a metal ion or being neutralized by metal ions, and from about 10 to 0.5% by weight of at least one polymeric crosslinking agent which contains reactive groups and comprises more than 51% by weight, (based on 100 parts by weight of the crosslinking agent) of ethylene or other olefin groups and 1 to 49% by weight of acrylate and/or methacrylate groups and reactive groups, the reactive groups being epoxy, isocyanate, ketone, aldehyde, silane, alkyl halide and/or anhydride groups, and, if desired or required, at least one filler, additive and/or processing aid.

According to the invention, the film is a deep-drawable laminated film which contains a polyolefin-containing top film and at least one polyolefin-containing bottom film, which differs qualitatively and/or quantitatively from the composition of the top film and has the above-enumerated polymer components, and, if required, a surface protection layer. The top film has a certain composition in accordance with the present invention.

A very wide range of films based on polyolefins, and in particular those based on polypropylene with polyethylene, and the processing thereof are already known (cf. inter alia FR-A 2017705). However, depending on the field of use, the requirements which the films have to meet are so varied and are associated with increasing demands, so that there is a need for films having improved processing possibilities.

U.S. Pat. No. 5,206,294 discloses a polymer blend which contains partially crosslinked EPDM, polypropylene, polymers or ionomers containing reactive groups and a polymeric crosslinking agent containing reactive groups. The monofilms produced therefrom are readily deep-drawable but do not have other properties required by the automotive industry.

In connection with this invention, a large number of tests were carried out with film formulations, in which, inter alia, those which contained a crosslinked PP-EPDM and an uncrosslinked propylene block copolymer or heterophase propylene block polymer were tested. These films have good grain stability and have a certain degree of dulling or a certain dullness, as desirable in many fields of use (for example, interior lining in automobiles or the like).

However, the film having this composition has the disadvantage that it is poorly deep-drawable, since the grain stability is partly lost. The result is therefore that the deep-drawability of the film is in need of improvement.

The hitherto known processes for dulling flexible PP-EP or PP-EPDM compositions with mineral fillers, for example, talc, result in an increase in the rigidity and a deterioration in the aging behavior. Furthermore, the matte effect is greatly influenced by the degree of deformation. The use of elastomeric particles in rubber blends (cf. inter alia EP-B 0257242) is also unsuitable.

Plastic films have to meet special requirements for the production of deep-drawable automotive films or webs or automotive film layers, since different deep-drawing conditions must be maintained in the same molding. Nevertheless, the molding should have the same embossed structure and dullness in all parts. On the other hand, special requirements are set with regard to the scratch resistance of the plastic surfaces, fog values, the aging stability and the like.

SUMMARY OF THE INVENTION

One object of the present invention is to provide an improved film having improved properties or processing properties, compared with the prior art. A particular object of the invention is to provide a film having good grain stability and in which the surfaces are dull without additional dulling agents or have a certain dullness or degree of dulling. In particular, however, the film should be readily deep-drawable and embossable and should have grain stability and also be capable of being processed to give moldings or articles which have to meet relatively high requirements. Such fields of use are, for example, moldings, articles or deep-drawn parts for motor vehicles, in particular, motor vehicle interior linings.

In accomplishing these and other objects of the invention, there has been provided in accordance with one aspect of the present invention a deep-drawable laminated film, comprising: a polyolefin-containing bottom film which (based on 100 parts by weight of polymer in the film) comprises:

(d) from about 1 to 60% by weight of at least one partially crosslinked EPDM;

(e) from about 12 to 30% by weight of a propylene homopolymer, copolymer or graft polymer with or without reactive groups;

(f) from about 77 to 9.5% by weight of at least one polymer and/or ionomer containing reactive groups and based on ethylene and methacrylic acid or acrylic acid, at least some of the acid groups containing a metal ion or being neutralized by metal ions; and (g) from about 10 to 0.5% by weight of at least one polymeric crosslinking agent which contains reactive groups and comprises more than about 51% by weight (based on 100 parts by weight of (g) of ethylene or other olefin groups and from about 1 to 49% by weight of acrylate and/or methacrylate groups and reactive groups, the reactive groups being selected from epoxy, isocyanate, ketone, aldehyde, silane, alkyl halide and/ or anhydride groups; and at least one polyolefin-containing top film, which differs qualitatively and/or quantitatively from the composition of the bottom film, comprising (based on 100 parts by weight of plastic of the top film)

(a) from about 20 to 80 parts by weight of at least one crosslinked PP-EPDM (alloy or blend of propylene homo- and/or copolymer and crosslinked or partially crosslinked ethylene-propylene-diene copolymer) and (b) from about 80 to 20 parts by weight of an uncrosslinked propylene block copolymer or a heterophase propylene block polymer having an elastomer content of from about 35 to 75% by weight (based on 100 parts by weight of the uncrosslinked heterophase propylene block copolymer or propylene block polymer) in the block or in the chain, from about 15 to 1% by weight of (b) being replaced with the same amount by weight of a polymer and/or ionomer (c) containing reactive groups and being based on ethylene and methacrylic acid and/or acrylic acid, at least some of the acid groups containing metal ions or being neutralized by metal ions.

In accordance with another aspect of the present invention, there has been provided a process for the production of the deep-drawable laminated film as defined above, comprising the steps of:

heat plastifying components (a) to (c) of the top film in at least one extruder;

heat plastifying components (d) to (g) of the bottom film in at least one further extruder, at a temperature of from about 150° to 280° C., whereby two or more components of the bottom film at least partially undergo a reaction or coupling reaction at the extrusion temperature; and coextruding the laminated film through a single slot die.

In accordance with still another aspect of the present invention there has been provided a motor vehicle interior lining, comprising the laminated film as defined above.

Further objects, features and advantages of the present invention will become apparent from the detailed description of preferred embodiments that follows, when considered together with the attached figures of drawing.

DETAILED DESCRIPTION OF PREFERRED EMBODIMENTS

Figure 1:
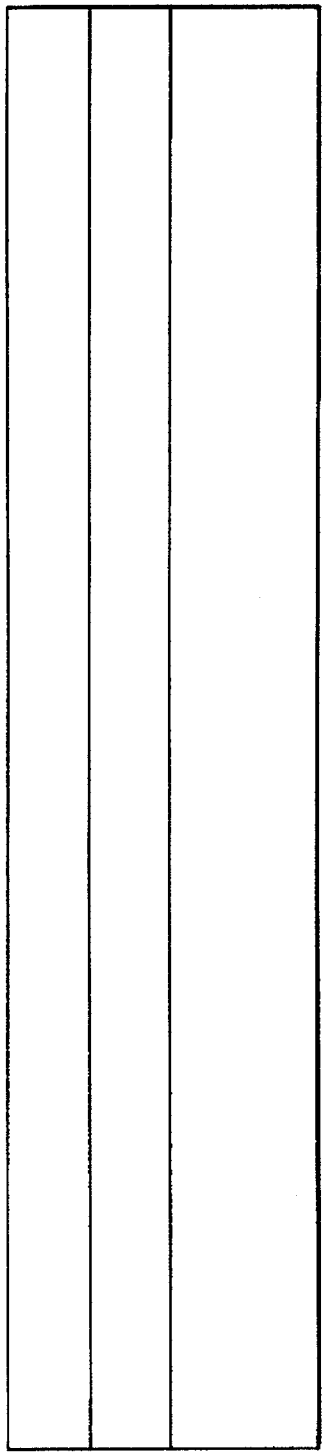
FIGS. 1 and 2 represent schematic illustrations of different embodiments of the films according to the present invention.

According to the invention, a deep-drawable film is provided which (based on 100 parts by weight of plastic of the film) comprises from about 1 to 60% by weight of (d) at least one partially crosslinked EPDM, from about 12 to 30% by weight of (e) a propylene homopolymer, copolymer or graft polymer with or without reactive groups, from about 77 to 9.5% by weight of (f) at least one polymer and/or ionomer containing reactive groups, which is based on ethylene and methacrylic acid or acrylic acid, some of the acid groups containing a metal ion or being neutralized by metal ions, and from about 10 to 0.5% by weight of (g) at least one polymeric crosslinking agent which contains reactive groups and comprises more than 51% by weight (based on 100 parts by weight of g) of ethylene or other olefin groups and 1 to 49% by weight of acrylate and/or methacrylate groups and reactive groups, the reactive groups being selected from epoxy, isocyanate, ketone, aldehyde, silane, alkyl halide and/or anhydride groups, and, if desired or required, at least one filler, additive and/or processing assistant. According to the invention, the film is a deep-drawable laminated film which contains a polyolefin-containing top film and at least one polyolefin-containing bottom film which differs qualitatively and/or quantitatively from the composition of the top film, and has the components (d), (e), (f) and (g) as plastic, and, if required, a surface protection layer. The top film comprises (based on 100 parts by weight of plastic of the top film) a) from about 20 to 80 parts by weight of at least one crosslinked PP-EPDM (alloy or blend of propylene homo- and/or copolymer and crosslinked or partially crosslinked ethylene-propylenediene copolymer) and b) from about 80 to 20 parts by weight of an uncrosslinked propylene block copolymer or a heterophase propylene block polymer having an elastomer content of from about 35 to 75% by weight (based on 100 parts by weight of the uncrosslinked heterophase propylene block copolymer or propylene block polymer) in the block or in the chain. In a preferred embodiment, from about 15 to 1% by weight, preferably from about 10 to 20% by weight, of (b) is replaced with the same amount by weight of a polymer and/or ionomer (c) containing reactive groups, (c) being at least one polymer and/or ionomer which contains reactive groups and is based on ethylene and methacrylic acid and/or acrylic acid, in which some of the acid groups preferably contain metal ions or are neutralized by metal ions. If desired or required for some applications, the top film and bottom film may contain one or more fillers, additives and/or processing aids.

Although the deep-drawability of the top film is in need of improvement and the bottom film furthermore does not meet the requirements of the automotive industry, for example, does not have good grain stability, the combination of top and bottom films in the laminated film surprisingly results in very good embossability, grain stability and very good deep-drawability.

The laminated film according to the invention is a flexible deep-drawable film or web for motor vehicles which is particularly suitable for the production of thermoformed moldings having a uniformly dull surface for films or sheets useful of interior linings for motor vehicles. The dullness of this film is substantially independent of the molding temperature and of the degree of deformation, i.e., the dullness of the film surface or of the thermoformed molding produced therefrom is identical or almost identical in all parts of the molding.

The top film preferably contains dynamically crosslinked or partially crosslinked PP-EPDM or PP-EPDM blends or alloys. The components a), b) and c) of the top film are, if appropriate or required for certain applications, used in combination with one or more processing aids, additives, fillers, dyes and/or colored pigments.

In a preferred embodiment of the top film, the melt flow index MFI (230/2.16) of the dynamically crosslinked or partially crosslinked PP-EPDM blend (determined according to DIN 53735) is less than about 12 g/10 min, preferably less than about 8 g/10 min, particularly preferably less than about 6 g/10 min. In a preferred embodiment, one of the components of the blend or alloy has a melt flow index MFI (230/2.16) of less than about 4.8 g/10 min, preferably less than about 2.5 g/10 min, particularly preferably less than about 1.8 g/10 min, while the other component of the PP-EPDM blend has a higher MFI.

For the top film, the polypropylene present or in the PP-EPDM blend dispersed therein, or the homo- or copolymer portion of the polypropylene, particularly preferably has a lower melt flow index. In a preferred embodiment, the PP (polypropylene) or the homo- or copolymer portion (PP) contained or dispersed in the blend has a melt flow index MFI (230/2.16) of from about 0.1 to 2 g/10 min, preferably from about 0.3 to 1.5 g/10 min (method of determination according to DIN 53735).

The polypropylene block of the uncrosslinked heterophase polypropylene block polymer preferably comprises a propylene copolymer and/or block polymer. In one preferred embodiment, the elastomer content of the heterophase polypropylene block copolymer is from about 40 to 70% by weight (based on 100 parts by weight of the uncrosslinked heterophase propylene block copolymer). According to another preferred embodiment, the elastomer content of the heterophase polypropylene block copolymer is from about 35.5 to 48% by weight, preferably from about 36 to 45% by weight (based on 100 parts by weight of the uncrosslinked heterophase propylene block copolymer).

In a preferred embodiment, the elastomer of the ethylene-propylene copolymer has an ethylene content of from about 20 to 70% by weight, preferably from about 30 to 60% by weight, and a propylene content of from about 80 to 30% by weight, preferably from about 70 to 40% by weight, and has a molecular weight greater than 100,000, preferably greater than about 150,000.

The addition of a dynamically crosslinked PP-EPDM blend to the top and/or bottom film, having a particle size of the crosslinked elastomer phase of from about 0.5 to 15 µm, improves the deformation range, the uniformity of the thermal expansion and the grain pattern.

An improved grain pattern means that the disproportionate extension of the grain valleys is limited by the strength which increases with increasing elongation (strain hardening). In order to achieve this effect, homogeneous incorporation of the crosslinked PP-EPDM blend and a particle-like elastomer structure are necessary. This results in certain requirements with regard to the degree of crosslinking and the melt flow index of the crosslinked PP-EPDM blends used. The degree of crosslinking in the complex systems, indirectly defined by the compression set at 70° C. after 22 hours (DIN 53517), should be between about 25 and 60.

The heterophase propylene block polymer used is preferably a block polymer having an MFI (230/2.16) of from about 0.3 to 8 g/10 min, preferably from about 0.5 to 7 g/10 min.

The PP-EPDM, preferably dynamically crosslinked or partially crosslinked PP-EPDM, used for the top and/or bottom film(s) is preferably one which has a density of between about 0.78 and 0.96 g/cm$^3$, preferably from about 0.83 to 0.93 g/cm$^3$. The PP-EPDM chosen for this purpose preferably has an initial flexural modulus—measured according to ASTM D 790 with a 2 mm thick film web—of from about 80 to 400 MPa, preferably from about 100 to 300 MPa.

In a preferred embodiment, the bottom film or bottom films are made of (based on 100 parts by weight of plastic of the bottom film or bottom films) d) from about 5 to 55% by weight of at least one partially crosslinked EPDM, e) from about 13 to 25% by weight of a propylene homopolymer, copolymer or graft polymer with or without reactive groups, f) from about 73 to 19% by weight of at least one polymer and/or ionomer which contains reactive groups and is based on ethylene and methacrylic acid or acrylic acid, some of the acid groups containing a metal ion or being neutralized by metal ions, and g) from about 9 to 1% by weight of at least one polymeric crosslinking agent which contains reactive groups and comprises more than 51% by weight (based on 100 parts by weight of g) of ethylene or other olefin groups and 1 to 49% by weight of acrylate and/or methacrylate groups and reactive groups. The reactive groups are preferably selected from epoxy, isocyanate, ketone, aldehyde, silane, alkyl halide and/or anhydride groups. Alternatively, the bottom film(s) contains or contain these components in addition to others.

The deep-drawable laminated films according to the invention possess, on the top film, a gloss, according to DIN 57530/60°, of about 0.5 to 5, which is not significantly influenced either by the required molding temperature or by the deep-drawing ratio. This feature thus distinguishes the films according to the invention from the knowledge, gained from experience to date, of films which were dulled by means of fillers or embossing.

Using the additive according to the invention or the mixture according to the invention for the production of deep-drawable automotive films, it is possible to obtain plastic films having a dull surface and high elasticity for thermoforming. The thermoforming of the laminated film according to the invention can be carried out in a wide temperature range from about 140° to 200° C., preferably from about 150° to 185° C., without particular difficulties occurring. The film can be deep-drawn in an excellent manner and can be used both in the positive deep-drawing process and in the negative deep-drawing process. Using the composition, it is possible to obtain deep-drawn films having a Shore D hardness of about 25 to 60, preferably about 30 to 55, and a gloss, according to Gardner at 60° C., of about 0.5 to 1.5, measured on the deep-drawn molding.

The automotive laminated film webs according to the invention for interior lining furthermore have the advantage of high aging stability to light and heat and low fog values.

In a preferred embodiment, the top and/or bottom film has a filler content of 0 to about 30 parts by weight, preferably about 0 to 20 parts by weight (based on 100 parts by weight of plastic). The fillers known per se, preferably talc and/or $SiO_2$, having a mean particle size of from about 0.01 to 20 µm, preferably from about 0.05 to 10 µm, may be used as fillers.

The processing aids used are, inter alia, preferably known heat stabilizers and/or light stabilizers for polyolefins. Lubricants or lubricant mixtures are among the other processing aids or additives used.

In one embodiment, an adhesion-promoting layer is preferably arranged below the film layer. The adhesion-promoting layer preferably consists of an acrylate, a polyurethane or an acrylate/polyurethane mixture or contains these. A foam layer, a substrate layer, a fabric layer and/or a support layer are preferably arranged underneath the film layer or adhesion-promoting layer. The foam layer preferably is made wholly or partially of a polyolefin foam or a polyurethane foam.

The top film preferably has an average thickness of from about 60 to 500 µm, preferably from about 100 to 350 µm. The bottom film or bottom films has or have an average thickness of from about 100 to 2000 µm, preferably from about 500 to 1500 µm, the bottom film or bottom films having a total thickness which is more than about 1.5 times, preferably about 2 or more times, that of the top film.

The laminated film according to the invention is very readily thermoformable and is used for the production of moldings which have low stress and exactly reproduce dimensionally- or thermally-stable surface structures. The laminated film is preferably worked or processed by the positive deep-drawing process and/or negative deep-drawing process. The laminated material preferably has, on the lower side or lower surface, a foam layer, for example, polyurethane foam, but preferably polyolefin foam, and/or is provided with a substrate layer or a substrate and/or a support layer and/or a lattice layer or fabric layer. In a preferred embodiment, the film or layer is provided with decorative features, grains, embossing and the like, has a stable grain, is easy to handle and can be printed. Using the laminated film according to the invention, it is possible to produce moldings or articles whose surface has good grain stability, even on storage at elevated temperatures.

The articles, moldings, parts and the like which are produced or deep-drawn therefrom and preferably contain a foam layer or substrate layer or a substrate, a support layer and/or a lattice layer or fabric layer are preferably used for switch panels or dashboards for motor vehicles, side panel parts for motor vehicles, door linings for motor vehicles, interior roof linings (roof liners), interior rear panel parts for motor vehicles (rear-window shelf) and other interior lining parts or articles for motor vehicles.

In a preferred embodiment, the substrate layer and/or foam layer is polyolefin-containing or is based on polyolefins.

According to a preferred embodiment, in addition to acrylate and/or methacrylate groups, or acrylic acid and/or methacrylic acid groups, and more than 51% by weight of ethylene and/or olefin or ($CH_2$)— or CH— groups, the polymeric crosslinking agent g) of the bottom film or bottom films which contains reactive groups also includes epoxy groups or epoxy-like groups, preferably glycidyl groups. The polymers and/or ionomers (g) of the bottom film which contain reactive groups contain, as metal ions, preferably alkali metal and/or alkaline earth metal ions and/or zinc ions. In a preferred embodiment, the polymers and/or ionomers (g) having reactive groups contain alkyl acrylates and/or alkyl methacrylates having 1 to 8 C atoms.

In a preferred embodiment of the invention, the top film has a Shore D hardness, or is adjusted to a Shore D hardness, which is more than about 3 Shore D units, preferably from about 5 to 10 Shore D units, lower than the Shore D hardness of the bottom film(s), and/or the surface tension of the top film is adjusted to a value greater than about 40 mN/m. The Shore D hardness of the top film is preferably adjusted to a Shore D hardness of less than about 37, preferably to a Shore D hardness of from about 28 to 35, with a choice of the weights of the components of the top film, preferably of the components (a), (b) and/or (c), within the stated amounts by weight of the components, and/or the Shore D hardness of the bottom film(s) is adjusted to at least about 38 Shore D, preferably from about 39 to 48 Shore D, with a choice of the weights of the components of the bottom film(s), preferably of the components (d), (e), (f) and/or (g), within the stated amounts by weight.

In a further preferred embodiment, at least one polyacrylate-, polymethacrylate- and/or polyurethane-containing layer is arranged above the top film or on the film surface and/or below the bottom film, the thickness of which layer is smaller than the layer thickness of the top film or bottom film, the layer thickness of the coating preferably being less than about 50% of the layer thickness of the top or bottom film(s).

The top film and, if required, parts of the bottom film(s) are preferably embossed or grained, and the top film is provided with a polyacrylate-, polymethacrylate-and/or polyurethane-containing layer or coating which contains from about 0.01 to 18% by weight, preferably from about 0.1 to 12% by weight, of at least one finely divided dulling agent and is applied by coating in a diluent.

The layer(s) or coating(s) which is (are) arranged below the bottom film(s) and contain(s) or comprise polyacrylate, polymethacrylate and/or polyurethane (based on the plastic content) preferably contain(s) at least one antistatic agent and/or at least one adhesion-promoting chemical agent, preferably very finely divided carbon or carbon black having a mean particle size of less than about 100 nm, preferably between about 10 and 80 nm, and/or at least one very finely divided silicic acid or one very finely divided silica and/or very finely divided silicate having a mean particle diameter of less than about 4 µm, preferably less than about 3 µm.

The present invention furthermore relates to a process for the production of the deep-drawable laminated film, in which two or more extruders equipped with a slot die are used for the production of the plastic film.

According to the invention, the components (a) to (c) of the top film are extruded in at least one extruder, and the components (d) to (g) of the bottom film or bottom films are extruded in at least one further extruder, at temperatures of about 150° to 280° C. preferably about 180° to 250° C. Two or more components of the bottom film, preferably the components (f) and (g), partially undergo a reaction or coupling reaction at the extrusion temperature with the use of a twin-screw extruder. The laminated film is produced as a coextruded film.

In a further preferred embodiment of the process according to the invention, with the use and/or concomitant use of at least one plastic containing polyolefin or containing polyolefin groups and having a relatively low Shore D hardness (measured according to DIN 53505) and, if required, with the use of at least one plastic containing polyolefin or containing polyolefin groups and having a relatively high Shore D hardness, the Shore D hardness of the top film is adjusted to a Shore D value which is more than about 3 Shore D units, preferably from about 5 to 10 Shore D units, lower than the Shore D value of the bottom film arranged underneath. The hardness of the top film is adjusted to a hardness of less than about 37 D Shore, preferably from about 28 to 35 D Shore (measured according to DIN 53505), with a choice of the weights of the components of the top film, preferably of the components (a), (b) and/or (c), within the stated amounts by weight of the components, and/or the hardness of the bottom film(s) are adjusted to at least about 38 D Shore, preferably from about 39 to 46 D Shore, with a choice of the weights of the components of the bottom film(s), preferably of the components (d), (e), (f) and/or (g).

In a preferred embodiment, the top film (on its surface facing away from the bottom film) and/or the bottom film (on its surface facing away from the top film) can be provided with at least one polyacrylate-, polymethacrylate- and/or polyurethane-containing coating containing diluents, preferably organic chemical solvents, with the use of a process for applying coating materials, preferably with the use of a spray, atomizing, brushing or roller-coating process or a process for application by means of printing rollers. The coating of the top film contains from about 0.01 to 18% by weight, preferably from about 0.1 to 12% by weight, of at least one finely divided dulling agent.

At least one adhesion-promoting antistatic agent and/or at least one adhesion-promoting chemical agent, preferably very finely divided carbon or carbon black having a mean particle size of less than about 100 nm, preferably between about 10 and 80 nm, and/or at least one very finely divided silicic acid or one very finely divided silica and/or silicate having a mean particle diameter of less than about 4 µm, preferably less than about 3 µm, is preferably used for the layer or coating arranged underneath the bottom film.

The present invention furthermore relates to the use of the laminated film, alone or in combination with a foam layer, substrate layer or a substrate, support layer, spacer layer or a lattice or fabric layer, for the production of motor vehicle interior linings, preferably for switch panels or dashboards for motor vehicles, side panel parts for motor vehicles, door linings for motor vehicles, interior roof linings (roof liners), interior rear panel parts for motor vehicles (rear-window shelf) and other interior lining parts or articles for motor vehicles.

The following examples are illustrative of preferred embodiments of the films according to the present invention, and are not to be considered in any way limiting.

|  | Example 1 | Example 2 |
|---|---|---|
| Examples of top film | | |
| PP block polymer[1] | 80 | — |
| PP block polymer[2] | — | 60 |
| PP-EPDM[3] | 10 | 10 |
| PP-EPDM[4] | — | 10 |
| Ionomer[5] | 10 | — |
| Ionomer[6] | — | — |
| | 100 | 100 |
| Examples of bottom film | | |
| PP block polymer[1] | 30 | — |
| PP-MA[9] | — | 30 |
| EPDM[7] | 40 | — |
| EPDM[8] | — | 30 |
| Ionomer[5] | 27 | — |
| Ionomer[6] | — | 35 |
| Ethylene glycidyl methacrylate | 3 | 5 |
| | 100 | 100 |

[1] MFI = 0.8 230° C./21.6 N
[2] MFI = 3.0 230° C./21.6 N
[3] MFI = 5.0 230° C./21.6 N
[4] MFI = 30.0 230° C./21.6 N
[5] Cation type zinc MFI 1.0 190° C./21.6 N
[6] Cation type zinc MFI 3.0 190° C./21.6 N
[7] Mooney viscosity ML 1 + 4 121° C. = 40
[8] Mooney viscosity ML 1 + 4 121° C. = 48
[9] Acrylic acid content 6%

Figure 2:
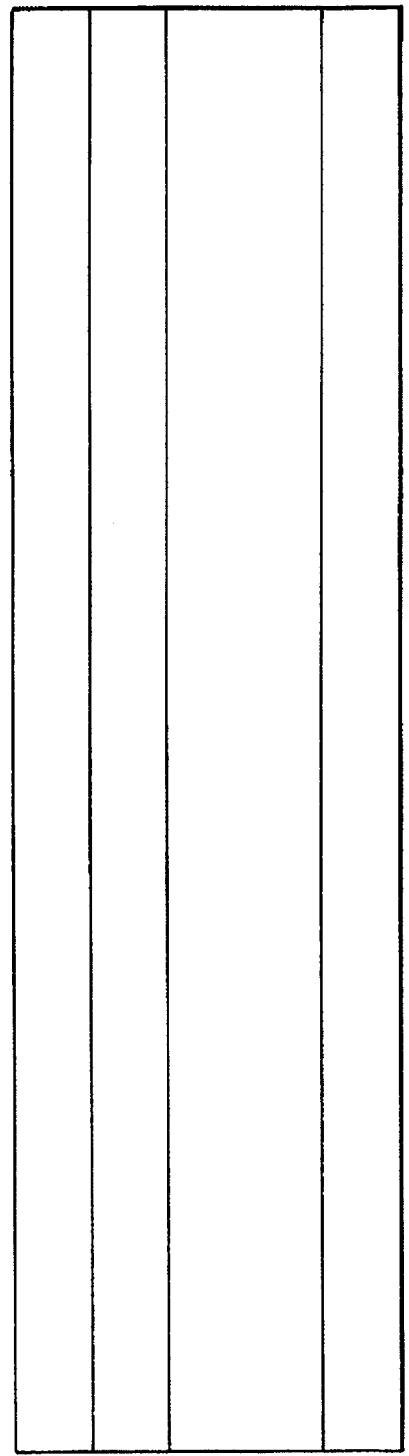

In the attached drawings (FIGS. 1 and 2), some preferred embodiments of the laminated film according to the invention are shown schematically, the thickness dimensions not corresponding to the actual thicknesses of the layers (in particular in the case of the surface protection layer or surface coating, which in practice is between about 8 and 60 μm, preferably about 10 to 50 μm). Reference numeral 1 represents the surface coating or surface protection layer, which is preferably applied in the form of a diluent or solvent, such as synthetic resin, for surface coating. The bottom film(s) 3 is (are) arranged underneath the top film 2. In addition, a further layer 4 which is a foam layer and/or substrate layer is shown schematically in FIG. 2.

What is claimed is:

1. A deep-drawable laminated film, comprising:

a polyolefin-containing bottom film which (based on 100 parts by weight of polymer in the film) comprises:
   (d) from about 1 to 60% by weight of at least one partially crosslinked EPDM;
   (e) from about 12 to 30% by weight of a propylene homopolymer, copolymer or graft polymer with or without reactive groups;
   (f) from about 77 to 9.5% by weight of at least one polymer and/or ionomer containing reactive groups and based on ethylene and methacrylic acid or acrylic acid, at least some of the acid groups containing a metal ion or being neutralized by metal ions; and
   (g) from about 10 to 0.5% by weight of at least one polymeric crosslinking agent which contains reactive groups and comprises more than about 51% by weight (based on 100 parts by weight of (g)) of ethylene or other olefin groups and from about 1 to 49% by weight of acrylate and/or methacrylate groups and reactive groups, the reactive groups being selected from epoxy, isocyanate, ketone, aldehyde, silane, alkyl halide and/or anhydride groups; and at least one polyolefin-containing top film, which differs qualitatively and/or quantitatively from the composition of the bottom film, comprising (based on 100 parts by weight of plastic of the top film)
   (a) from about 20 to 80 parts by weight of at least one crosslinked PP-EPDM (alloy or blend of propylene homo- and/or copolymer and crosslinked or partially crosslinked ethylene-propylene-diene copolymer) and
   (b) from about 80 to 20 parts by weight of an uncrosslinked propylene block copolymer or a heterophase propylene block polymer having an elastomer content of from about 35 to 75% by weight (based on 100 parts by weight of the uncrosslinked heterophase propylene block copolymer or propylene block polymer) in the block or in the chain, from about 15 to 1% by weight of (b) being replaced with the same amount by weight of a polymer and/or ionomer (c) containing reactive groups and being based on ethylene and methacrylic acid and/or acrylic acid, at least some of the acid groups containing metal ions or being neutralized by metal ions.

2. A deep-drawable laminated film as claimed in claim 1, wherein, in the top film, the polypropylene block of the uncrosslinked heterophase polypropylene block polymer comprises a propylene homopolymer, copolymer and/or block polymer, and the elastomer content of the heterophase polypropylene block copolymer is from about 40 to 70% by weight (based on 100 parts by weight of the uncrosslinked heterophase propylene block copolymer).

3. A deep-drawable laminated film as claimed in claim 2, wherein the elastomer of the ethylene-propylene copolymer has an ethylene content of from about 20 to 70% by weight, and a propylene content of from about 80 to 30% by weight and has a molecular weight greater than about 100,000.

4. A deep-drawable laminated film as claimed in claim 1, wherein the heterophase propylene block polymer has an MFI (230/2.16 g/10 min) of from about 0.3 to 8.

5. A deep-drawable laminated film as claimed in claim 1, wherein the PP-EPDM contained in the top and/or bottom film has a density of between about 0.78 and 0.96 g/cm³, and the bottom film comprises (based on 100 parts by weight of polymer of the bottom film)
   (d) from about 5 to 55% by weight of at least one partially crosslinked EPDM;
   (e) from about 13 to 25% by weight of a propylene homopolymer, copolymer or graft polymer with or without reactive groups;
   (f) from about 73 to 19% by weight of at least one polymer and/or ionomer which contains reactive groups and is based on ethylene and methacrylic acid or acrylic acid, at least some of the acid groups containing a metal ion or being neutralized by metal ions, and
   (g) from about 9 to 1% by weight of at least one polymeric crosslinking agent which contains reactive groups and comprises more than about 51% by weight (based on 100 parts by weight of (g)) of ethylene or other olefin groups and from about 1 to 49% by weight of acrylate and/or methacrylate groups and reactive groups, the reactive groups being selected from epoxy, isocyanate, ketone, aldehyde, silane, alkyl halide and/or anhydride groups.

6. A deep-drawable laminated film as claimed in claim 5, wherein said PP-EPDM comprises dynamically crosslinked or partially crosslinked PP-EPDM.

7. A deep-drawable laminated film as claimed claim 1, wherein the PP-EPDM for the bottom film and/or top film has an initial flexural modulus, measured according to ASTM D 790 with a 2 mm thick film web, of from about 80 to 400 MPa.

8. A deep-drawable laminated film as claimed in claim 1, wherein the polymeric crosslinking agent (g) of the bottom film which contains reactive groups further includes epoxy groups.

9. A deep-drawable laminated film as claimed in claim 1, wherein the polymers and/or ionomers (g) of the bottom film which contain reactive groups contain metal ions selected from the group consisting of alkali metal ions, alkaline earth metal ions and zinc ions.

10. A deep-drawable laminated film as claimed in claim 1, wherein the polymers and/or ionomers (g) which contain reactive groups contain alkyl acrylates and/or alkyl methacrylates having 1 to 8 C atoms.

11. A deep-drawable laminated film as claimed in claim 1, wherein the top film has an average thickness of from about 60 to 500 μm and the bottom film has an average total thickness of from about 100 to 2500 μm the thickness of the bottom film being more than about 1.5 times that of the top film.

12. A deep-drawable laminated film as claimed in claim 1, wherein the top film has a Shore D hardness which is more than about 3 Shore D units lower than the Shore D hardness of the bottom film, and the surface tension of the top film is adjusted to a value greater than about 40 mN/m.

13. A deep-drawable laminated film as claimed in claim 1, wherein the Shore D hardness of the top film has been adjusted to a Shore D hardness of less than about 37, and the Shore D hardness of the bottom film has been adjusted to at least about 38 Shore D.

14. A deep-drawable laminated film as claimed in claim 1, further comprising at least one polyacrylate-, polymethacrylate- and/or polyurethane-containing layer arranged above the top film or on the film surface and/or below the bottom film, the thickness of which layer is smaller than the layer thickness of the top film or bottom film, the layer thickness of the coating preferably being less than about 50% of the layer thickness of either of the top or bottom films.

15. A deep-drawable laminated film as claimed in claim 1, wherein the top film is embossed or grained and provided with a polyacrylate-, polymethacrylate- and/or polyurethane-containing layer or coating which contains from about 0.01 to 18% by weight of at least one finely divided dulling agent.

16. A deep-drawable laminated film as claimed in claim 1, further comprising a layer or coating arranged below the bottom film, said layer or coating containing polyacrylate, polymethacrylate and/or polyurethane and at least one antistatic agent and/or at least one adhesion-promoting chemical agent.

17. A deep-drawable laminated film as claimed in claim 16, wherein said adhesion-promoting agent comprises very finely divided carbon or carbon black having a mean particle size of less than about 100 nm, and/or at least one very finely divided silicic acid or one very finely divided silica and/or very finely divided silicate having a mean particle diameter of less than about 4 μm.

18. A deep-drawable laminated film as claimed in claim 1, wherein, in the top film, the polypropylene block of the uncrosslinked heterophase polypropylene block polymer comprises a propylene homopolymer, copolymer and/or block polymer, and the elastomer content of the heterophase polypropylene block copolymer is from about 35.5 to 48% by weight (based on 100 parts by weight of the uncrosslinked heterophase propylene block copolymer).

19. A motor vehicle interior lining, comprising the laminated film as claimed in claim 1.

20. A motor vehicle interior lining a claimed in claim 19, further comprising a foam layer, a substrate layer, a support layer, a spacer layer or a lattice or fabric layer.

21. A deep-drawable laminated film as claimed in claim 1, further comprising a foam layer, a substrate, support layer, a spacer layer or a lattice or fabric layer.

* * * * *